US012181222B2

(12) United States Patent
Morellato

(10) Patent No.: US 12,181,222 B2
(45) Date of Patent: Dec. 31, 2024

(54) TAP HOLE PLUG GUN

(71) Applicant: TMT TAPPING MEASURING TECHNOLOGY SARL, Luxembourg (LU)

(72) Inventor: Franck Morellato, Arnaville (FR)

(73) Assignee: TMT TAPPING MEASURING TECHNOLOGY SÀRL, Luxembourg (LU)

( * ) Notice: Subject to any disclaimer, the term of this patent is extended or adjusted under 35 U.S.C. 154(b) by 553 days.

(21) Appl. No.: 17/438,234

(22) PCT Filed: Mar. 13, 2019

(86) PCT No.: PCT/EP2019/056266
§ 371 (c)(1),
(2) Date: Sep. 10, 2021

(87) PCT Pub. No.: WO2020/182304
PCT Pub. Date: Sep. 17, 2020

(65) Prior Publication Data
US 2022/0205722 A1 Jun. 30, 2022

(51) Int. Cl.
*F27D 3/15* (2006.01)
*C21B 7/12* (2006.01)
*C21C 5/46* (2006.01)

(52) U.S. Cl.
CPC .............. *F27D 3/1536* (2013.01); *C21B 7/12* (2013.01); *C21C 5/4653* (2013.01)

(58) Field of Classification Search
CPC ........ C21B 7/12; C21C 5/4653; F27D 3/1536
USPC .................................. 266/45, 271, 272, 273
See application file for complete search history.

(56) References Cited

U.S. PATENT DOCUMENTS 1,774,373 A * 8/1930 Hopkins et al. .......... C21B 7/12 266/171
3,682,456 A * 8/1972 Berczynski ............... C21B 7/12 266/236
3,984,091 A * 10/1976 Schneider ................. C21B 7/12 266/273
(Continued)

FOREIGN PATENT DOCUMENTS

CA 1048780 A 2/1979
CN 201261788 Y 6/2009
(Continued)

OTHER PUBLICATIONS

The State Intellectual Property Office of People's Republic of China, First Office Action and Search Report, Application No. 201980094036.1, Apr. 20, 2022, 12 pages.
(Continued)

*Primary Examiner* — Jessee R Roe
*Assistant Examiner* — Michael Aboagye
(74) *Attorney, Agent, or Firm* — Quarles & Brady LLP

(57) ABSTRACT

A tap hole plug gun comprising a material chamber for receiving a plugging compound and a mouthpiece for being placed on a tap hole, the mouthpiece being connected to a nozzle part disposed on the material chamber by means of an unlockable connection device. The connection device is realized as a hinged joint arrangement, the hinged joint arrangement having two opposite hinged joints each having a joint bolt which can be removed from the connection to a joint plate arrangement.

5 Claims, 5 Drawing Sheets

(56) References Cited

U.S. PATENT DOCUMENTS

| | | | | |
|---|---|---|---|---|
| 4,072,250 | A | 2/1978 | Pedersen et al. | |
| 4,135,705 | A * | 1/1979 | Mailliet | C21B 7/12 266/273 |
| 8,343,418 | B2 * | 1/2013 | Vincent | F27D 3/1536 266/272 |
| 2022/0178615 | A1 * | 6/2022 | Morellato | C21C 5/4653 |

FOREIGN PATENT DOCUMENTS

| | | | | |
|---|---|---|---|---|
| CN | 102690917 | A | 9/2012 | |
| CN | 203247281 | U | 10/2013 | |
| CN | 101929800 | B | 11/2013 | |
| CN | 204080002 | U | 1/2015 | |
| CN | 106914981 | A | 7/2017 | |
| CN | 105737614 | B | 6/2018 | |
| CN | 108276011 | A | 7/2018 | |
| DE | 19755932 | * | 12/1997 | F27D 3/1536 |
| DE | 19755932 | C1 | 12/1998 | |
| EP | 0498187 | A1 | 8/1992 | |
| EP | 2264391 | A1 | 12/2010 | |
| JP | H11158517 | A | 6/1999 | |
| JP | 2001240907 | A | 9/2001 | |
| JP | 2014080660 | A | 5/2014 | |
| KR | 20020083018 | A | 11/2002 | |
| KR | 100416191 | B1 | 1/2004 | |
| TW | 567227 | B | 12/2003 | |
| TW | 201326407 | A | 7/2013 | |
| WO | 9741264 | A1 | 11/1997 | |
| WO | 2011089054 | A1 | 7/2011 | |

OTHER PUBLICATIONS

Korean Office Action for corresponding Application No. 9-5-2023-013094479, issued Feb. 8, 2023.

Canadian Intellectual Property Office, Office Action, Application No. 3130480, mailed Nov. 24, 2022.

Intellectual Property India, Examination Report, Application No. 202127035992, Aug. 30, 2022, 6 pages.

PCT International Search Report and Written Opinion, PCT/EP2019/056266, Jul. 8, 2021, 15 pages.

Taiwan Intellectual Property Office, Examination Report and Search Report, Application No. 109108175, Jul. 1, 2021, 8 pages.

* cited by examiner

Fig. 1
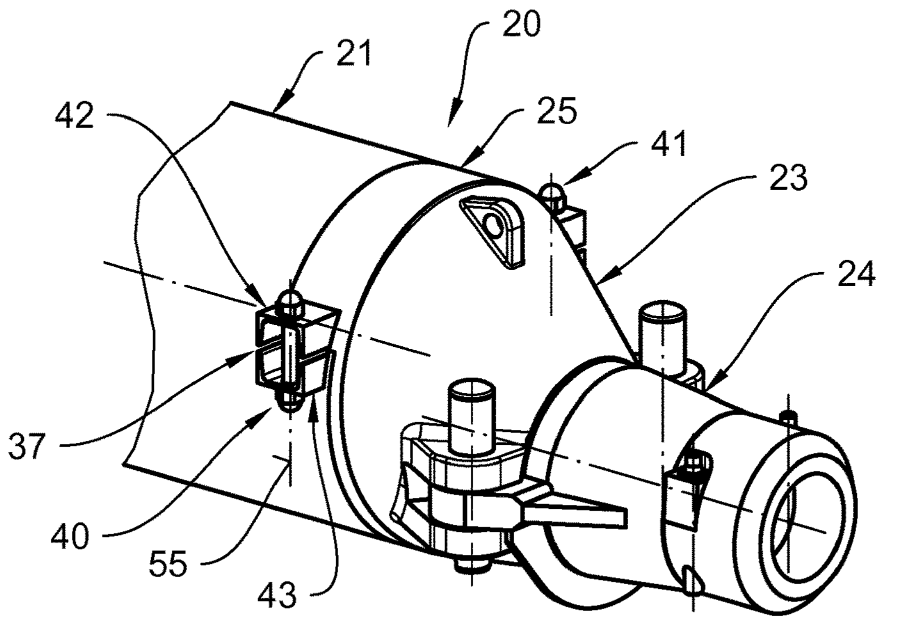
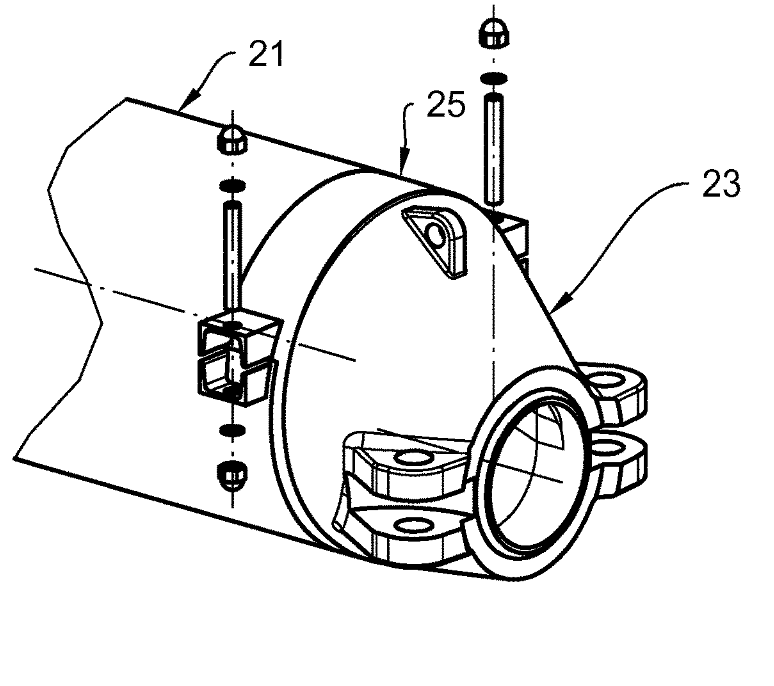
Fig. 2

Fig. 5
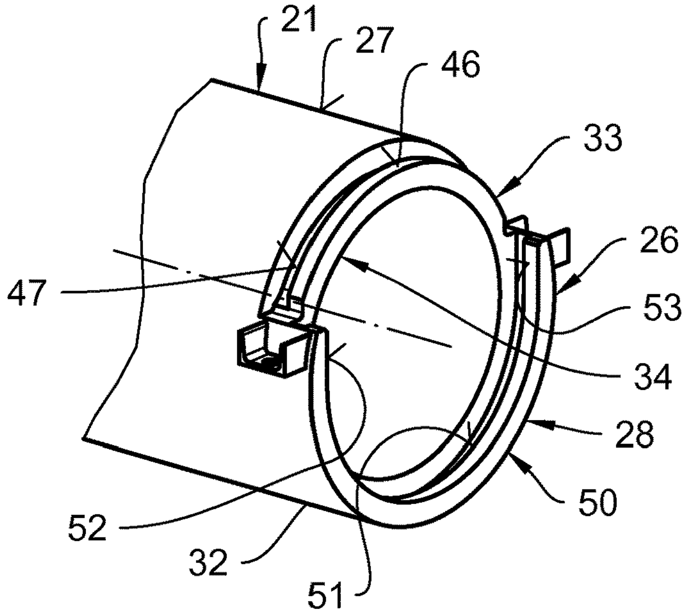
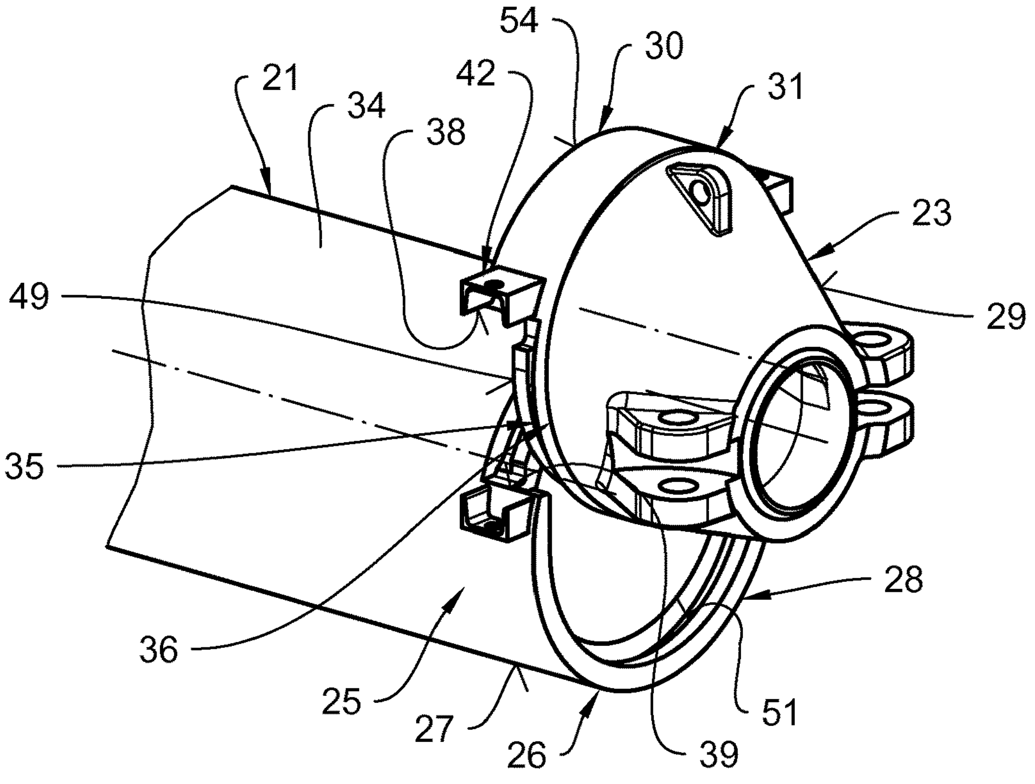
Fig. 6

Fig. 7
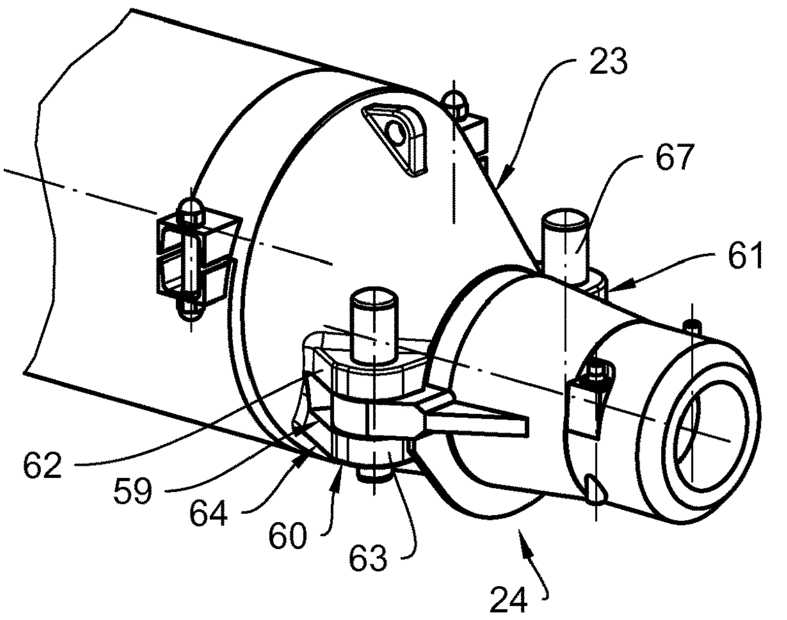
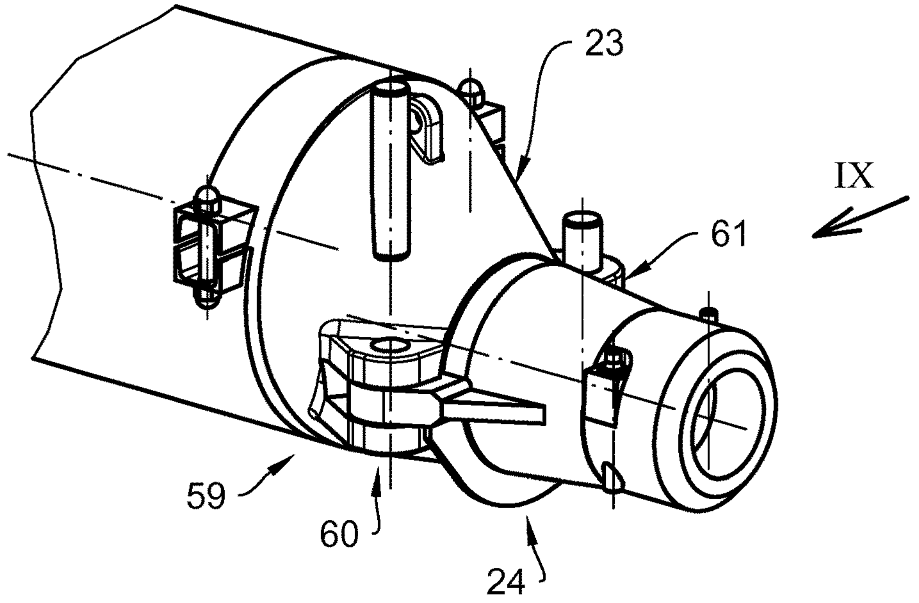
Fig. 8
Fig. 9
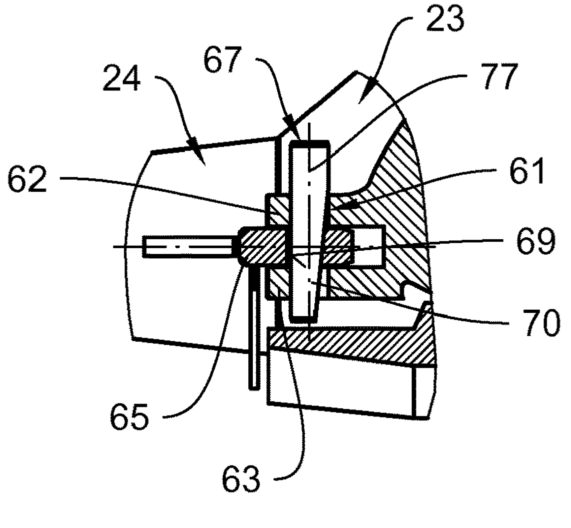

TAP HOLE PLUG GUN

This application represents the national stage entry of PCT International Application No. PCT/EP2019/056266 filed on Mar. 13, 2019, the entire contents of which is incorporated herein by reference for all purposes.

The disclosure relates to a tap hole plug gun comprising a material chamber for receiving a plugging compound and a mouthpiece for being placed on a tap hole, the mouthpiece being connected to the material chamber or to a nozzle part disposed on the material chamber by means of an unlockable connection device.

Tap hole plug guns of the kind mentioned above are used to close the tap openings of reduction furnaces or smelting furnaces, such as blast furnaces for producing pig iron and low-shaft furnaces for smelting nonferrous metals, ferroalloys, etc. During plugging, the tap hole plug gun is pressed against the front of the furnace with great force by means of a pivoting device, the contact pressure being maintained until the plugging compound injected into the tap hole opening of the furnace through the mouthpiece of the tap hole plug gun has hardened.

To operate the tap hole plug gun, the plugging compound is received in a material chamber of the tap hole plug gun, which is typically a cylindrical space, and is injected from the material chamber into the tap hole opening through the mouthpiece of the tap hole plug gun by means of a plugging piston. A typically conical nozzle part connected to the material chamber by means of a connecting device in an exchangeable manner can be disposed between the material chamber and the mouthpiece to reduce the diameter of the tap hole plug gun in the area of transition between the material chamber and the mouthpiece. Great forces act on the connection device during ejection because of the substantially reduced diameter in the section from the nozzle part to the mouthpiece, two essential requirements to be met by the connecting device being that the connection device has to be easy to detach for replacement of the nozzle part while being stable enough to reliably absorb the forces acting during ejection without impairing detachability.

Another unlockable connection device can be provided between the nozzle part and the mouthpiece, while the mouthpiece can also be connected directly to the material chamber by means of an unlockable connection device, i.e., without an interposed nozzle part, if the tap hole plug gun is a smaller tap hole plug gun whose material chamber has a comparatively small diameter.

WO 2011/089054 A1 discloses a tap hole plug gun having a nozzle part connected to the material chamber via a flange connection. In the known tap hole plug gun, another flange connection is provided between the nozzle part and the mouthpiece. The flange connections connect the nozzle part to the material chamber and the nozzle part to the mouthpiece in a connection plane perpendicular to the ejecting direction, connecting bolts distributed across the circumference of the tap hole plug gun and extending parallel to the ejecting direction connecting two opposite flanges disposed on the material chamber and on the nozzle part and on the nozzle part and the mouthpiece so as to realize the flange connections. Since the connecting bolts extend parallel to the ejecting direction, their number and size have to be such that the ejection forces can be safely transmitted via the bolts without this endangering the sealing of the tap hole plug gun in the connection plane or there even being a risk of the components of the bolt connections failing.

The large number of bolt connections distributed across the circumference of the tap hole plug gun for realizing the flange connections results in a corresponding amount of installation work when exchanging the nozzle part or the mouthpiece or when servicing the tap hole plug gun, which requires only temporary removal of the mouthpiece for accessing the discharge opening of the material chamber or of the nozzle part.

Hence, the object of the present disclosure is to propose a tap hole plug gun that has a connection device formed between the mouthpiece and the material chamber or between the mouthpiece and a nozzle part potentially disposed on the material chamber, said connection device making a reliable mechanical connection possible while allowing the mouthpiece to be exchanged or the tap hole plug gun to be serviced with relatively little installation effort.

According to the disclosure, the connection device is realized as a hinged joint arrangement between the mouthpiece and the material chamber or between the mouthpiece and the nozzle part, the hinged joint arrangement having two opposite hinged joints each having a joint bolt which connects a joint plate arrangement of the nozzle part to a joint plate arrangement of the mouthpiece and can be removed from the connection to the joint plate arrangements, the joint bolts having, at least in sections, a wedge portion which is wedge-shaped in the direction of a joint axis, and a joint plate of each hinged joint being provided with a jamb portion of a joint eyelet for receiving the wedge portion of the joint bolt, said jamb portion being wedge-shaped in the direction of the joint axis.

A hinged joint arrangement of this configuration for detachably connecting the mouthpiece to the material chamber or to the nozzle part enables easy removal of the mouthpiece by removing the joint bolts. During maintenance, removing only one of the joint bolts is an option, which means that there is a choice between which of the opposite hinged joints is to serve as a pivot bearing for pivoting the mouthpiece open or closed. The hinged joint arrangement according to the disclosure enables an identical configuration of the two opposite hinged joints.

Moreover, the interaction of the wedge portions of the joint bolts with the associated wedge-shaped jamb portions on the joint eyelets of the joint plates allows an axial sealing force to be achieved between opposite axial ends of the nozzle part and of the mouthpiece.

A particularly reliable configuration of the hinged joint arrangement becomes possible if the joint plate arrangements of the nozzle part each have two joint plates which are disposed at a vertical distance and between which a joint plate of the mouthpiece is disposed so as to realize the hinged joint, said joint plate having the joint eyelet with the wedge-shaped jamb portion.

Preferably, an axial engagement device is formed between opposite axial connecting edges of the nozzle part and of the mouthpiece, a defined radial relative alignment of the nozzle part and of the mouthpiece thus being present independent of the hinged joint arrangement.

Simultaneous radial sealing becomes possible if the engagement device has a ring web which is formed on one connecting edge and engages into a complementary ring groove formed on the other connecting edge.

Preferably, the ring web has a truncated cross section, which enables an axial sealing force and a radial sealing force simultaneously.

Hereinafter, a preferred embodiment of the disclosure will be explained in more detail with reference to the drawing.

FIG. 1 is an isometric illustration of a tap hole plug gun comprising a nozzle part disposed between a material chamber and a mouthpiece;

FIG. 2 shows the tap hole plug gun of FIG. 1 with a mouthpiece removed from the nozzle part;

FIG. 5 is an isometric illustration of the material chamber with an axial connecting projection formed on the lower part of the material chamber;

FIG. 6 shows the material chamber of FIG. 5 with a nozzle part disposed in the installed position above the connecting projection;

FIG. 7 shows the nozzle part of FIG. 1 with the mouthpiece connected to it via a hinged joint arrangement;

FIG. 8 shows the mouthpiece of FIG. 7 during an installation stage;

FIG. 9 is a side view of the mouthpiece illustrated in FIG. 8;

Figure 4:
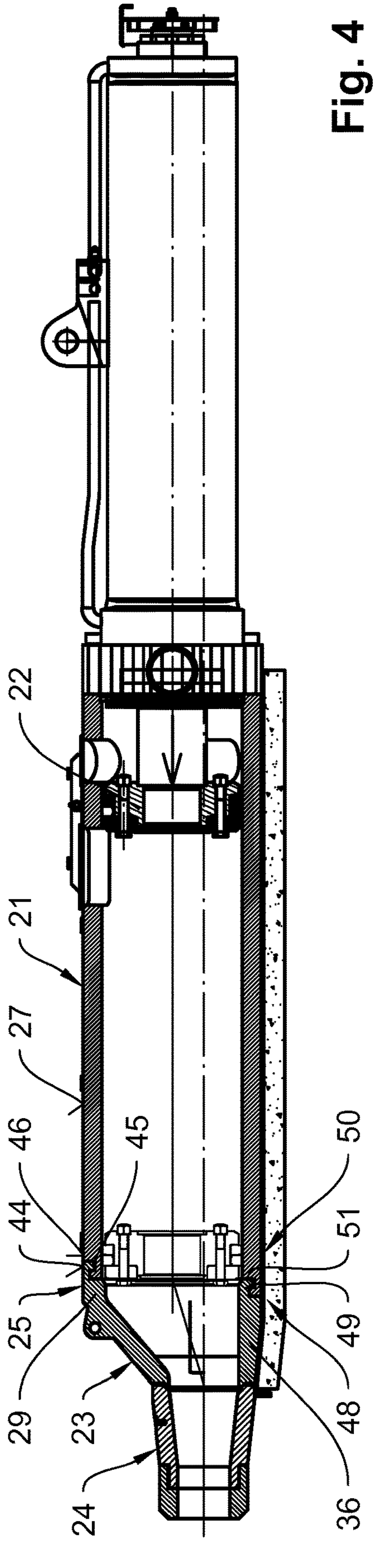
FIG. 4 is a longitudinal section view of the tap hole plug gun illustrated in FIG. 3.

FIG. 1 shows a tap hole plug gun 20 illustrated with its essential components, tap hole plug gun 20 comprising a material chamber 21 realized as a hollow cylinder as seen in particular from the illustration in FIG. 4, material chamber 21 serving to receive a plugging compound filled into material chamber 21 via a filling opening (not shown), compacted in material chamber 21 by means of a piston 22 guided in material chamber 21, and discharged into a tap hole of a furnace installation (not shown) from a mouthpiece 24 connected to material chamber 21 via a nozzle part 23, mouthpiece 24 being independent from nozzle part 23 in the embodiment of tap hole plug gun 20 at hand.

Nozzle part 23 enables a reduction of the inner diameter of tap hole plug gun 20 as required for the area of transition from material chamber 21 to mouthpiece 24, and for this purpose is truncated, in particular obliquely truncated in the exemplary embodiment at hand. As can be understood in particular from the illustration in FIG. 4, great axial forces resulting from the compression forces exerted on the plugging compound by piston 22 act on a connection device 25 formed between material chamber 21 and nozzle part 23 during compression of the plugging compound in material chamber 21 when tap hole plug gun 20 is in operation. As shown in FIG. 6, connection device 25 has an axial connecting projection 28 on an axial connecting edge 26 of a chamber wall 27 of material chamber 21 and a connecting projection 30 on an axial connecting edge 54 of a nozzle wall 29 of nozzle part 23 for establishing a form-fitting connection between material chamber 21 and nozzle part 23.

As becomes clear in particular from a combined view of FIGS. 5 and 6, connecting projection 30 of nozzle part 23 is formed on an upper part 31 of nozzle part 23 and connecting projection 28 of material chamber 21 is formed on a lower part 32 of material chamber 21, connecting projection 30 of nozzle part 23 thus resting on connecting projection 28 formed on material chamber 21, a form-fitting radial engagement being established between connecting projection 30 of nozzle part 23 and a connecting edge portion 33 on an upper part 34 of material chamber 21 on one side and between connecting projection 28 of material chamber 21 and a connecting edge portion 35 on a lower part 36 of nozzle part 23 on the other side.

As becomes clear from a comparison of FIGS. 6 and 2, which show nozzle part 23 in a relative position immediately prior to the establishment of the form-fitting engagement (FIG. 6) and in a relative position immediately after the establishment of the form-fitting engagement (FIG. 2), nozzle part 23 is already secured in its relative position in connection with material chamber 21 under the influence of gravity once the form-fitting engagement has been established. In order to also secure the relative position illustrated in FIG. 2 when compression forces are acting on nozzle part 23, a radially acting securing device 37 is provided in addition to the form-fitting engagement, said securing devices 37 having respective bolt connections 40, 41 (FIG. 1) on opposite horizontal connecting edge portions 38, 39 (FIG. 6), said bolt connections 40, 41 connecting two opposite connecting tabs 42 and 43 formed on connecting edge portion 38 of connecting projection 30 of nozzle part 23 and on connecting edge portion 39 of connecting projection 28 of material chamber 21, respectively, by means of a threaded bolt (not shown).

Hence, bolt connections 40, 41 secure connecting projections 28, 30 in their radial position, preventing compression forces occurring in tap hole plug gun 20 from severing the form-fitting engagement established between connecting projections 28, 30 and serving to absorb the axial portion of the compression forces.

For realizing the form-fitting engagement, a ring segment web 45 (FIG. 4) is formed on a connecting edge portion 44 on connecting projection 30 of nozzle part 23 on the radial interior of nozzle wall 29, said ring segment web 45 engaging into a ring web groove 47 (FIG. 5) formed on a connecting edge portion 46 on upper part 34 of material chamber 21 on the radial exterior of chamber wall 27.

As shown in FIG. 4, a ring segment web 49 is formed in a connecting edge portion 48 on lower part 36 of nozzle part 23 on the radial exterior of nozzle wall 29, said ring segment web 49 engaging into a ring segment groove 51 formed on a connecting edge portion 50 on connecting projection 28 of material chamber 21 on the radial interior of chamber wall 27.

As can be seen in particular from the illustration in FIG. 5, radially inner ring segment groove 51 formed in connecting projection 28 of material chamber 21 extends across a circumferential angle of >180° in such a manner that during establishment of the engagement, opposite groove ends 52, 53 of ring segment groove 51 can serve to form vertical guides for ends of ring segment web 45 which are formed on connecting projection 30 of nozzle part 23 and accordingly extend in the vertical direction.

Figure 3:
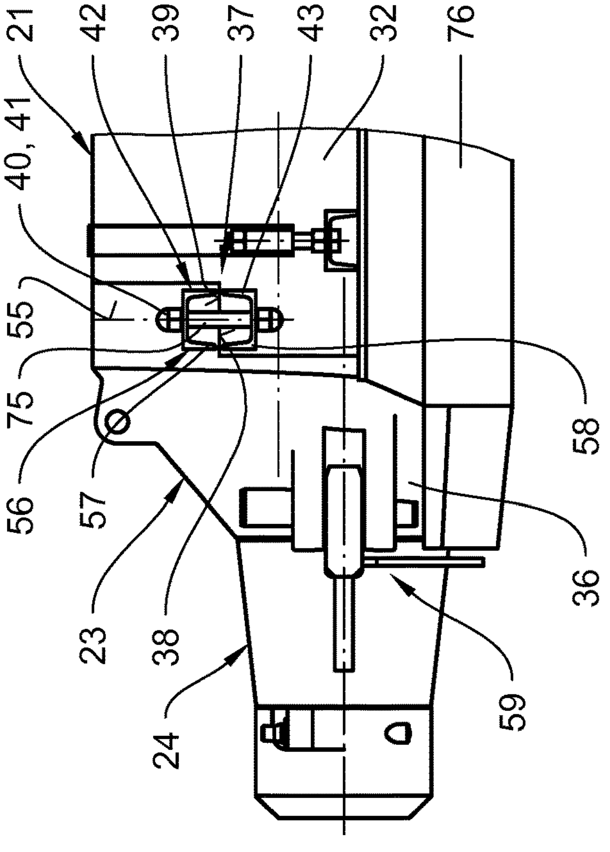
FIG. 3 is a partial side view of the tap hole plug gun illustrated in FIG. 1.

As can be seen in particular from FIG. 3, bolt connections 40, 41 are configured in such a manner that a bolt that connects connecting tabs 42, 43 in a force-fitting manner along a bolt axis 55 and is preferably realized as a threaded bolt 75 is protected against external influences on the side facing the mouthpiece 24 by a protective device 56 formed by protective webs 57, 58 realized vertically on connecting tabs 42 and simultaneously enabling flexural rigidity of connecting tabs 42.

A shielding device 76 is disposed on lower part 32 of material chamber 21 and on lower part 36 of nozzle part 23, in particular for protection against heat radiation emitted against tap hole plug gun 20 below tap hole plug gun 20.

As can be seen in particular from the sequence of FIGS. 7 to 10, mouthpiece 24 is realized as a component that is independent from nozzle part 23 in the case at hand, a hinged joint arrangement 59 being provided for connecting mouthpiece 24 to nozzle part 23, hinged joint arrangement 59 having two opposite hinged joints 60, 61 each having a joint plate arrangement 64 composed of two parallel joint plates 62, 63 and a joint plate arrangement 66 of nozzle part 23 formed by a single joint plate 65, both joint plate arrangements 64, 65 being connected via a joint bolt 67.

Figure 10:
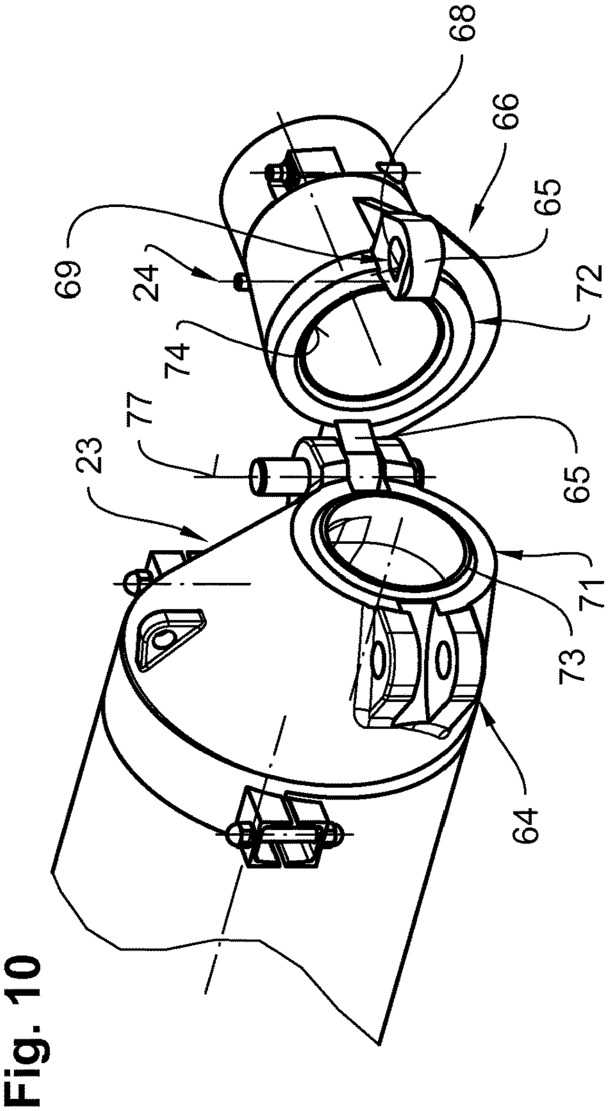
FIG. 10 shows the hinged joint arrangement of FIGS. 7 and 8 with a mouthpiece pivoted about a hinged joint.

As shown in FIG. 10, joint plate 65 disposed on mouthpiece 24 has a jamb portion 68 of a joint eyelet 69, said jamb portion 68 being wedge-shaped in the direction of a joint axis 77 and having a wedge shape complementary to a wedge portion 70 (FIG. 9) of joint bolt 67 in such a manner that when joint bolt 67 is disposed in hinged joints 60, 61, joint bolt 67 connects joint plate arrangement 64 of nozzle part 63 to joint plate 65 of mouthpiece 24, as shown in FIG. 7, in such a manner that wedge portion 70 is disposed in joint eyelet 69 of joint plate 65 and is connected to joint plate 65 in a non-rotating manner.

In the configuration illustrated in FIG. 7, both opposite hinged joints 60, 61 are provided with joint bolt 67 for forming joint axis 77, which means that mouthpiece 24 is fixated relative to nozzle part 23 and can be introduced into the tap hole by an advancing movement of tap hole plug gun 20, if required.

Figure 11:
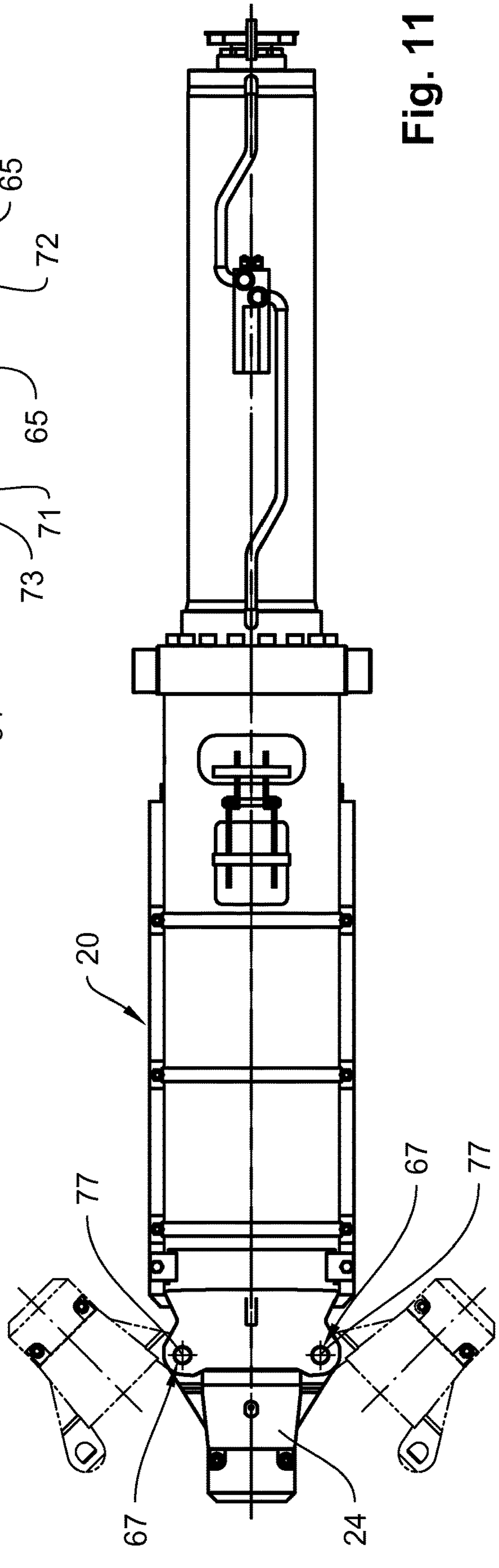
FIG. 11 is a bottom view of the tap hole plug gun illustrated in FIG. 4.

In the event that one of the two joint bolts 67 is removed from one of hinged joints 60 or 61, mouthpiece 24 can pivot on one side about joint axis 77, which is formed by joint bolt 67 remaining in hinged joint 60 or 61, for maintenance purposes, for example. Thus, as illustrated in FIG. 11, mouthpiece 24 can selectively pivot about a joint axis 77 in one direction or the other.

As can be seen from FIG. 10, an engagement device is formed between opposite axial connecting edges 71 and 72 of nozzle part 23 and of mouthpiece 24, respectively, said engagement device being composed of a ring web 73 formed on connecting edge 71 of nozzle part 23 on one side and of a ring groove 74 formed on connecting edge 72 of mouthpiece 24 on the other side and enabling radial sealing of the connection established between nozzle part 23 and mouthpiece 24 by hinged joint arrangement 59.

Preferably, ring web 73 has a truncated cross-section that is complementary to the cross-section of ring groove 74. The wedge effect made possible between jamb portions 68 of joint plates 65 and wedge portions 70 of joint bolts 67 can generate an axial sealing force between nozzle part 23 and mouthpiece 24 by inserting joint bolts 67 into joint eyelets 69 of joint plates 65, an effectively sealing position of mouthpiece 24 and nozzle part 23 relative to each other being achieved by means of said axial sealing force.

The invention claimed is:

1. A tap hole plug gun comprising a material chamber for receiving a plugging compound and a mouthpiece for being placed on a tap hole, the mouthpiece being connected to the material chamber or to a nozzle part disposed on the material chamber by an unlockable connection device, wherein the connection device comprises a hinged joint arrangement, the hinged joint arrangement having two opposite hinged joints each having a joint bolt which connects a joint plate arrangement of the nozzle part to a joint plate arrangement of the mouthpiece, the joint plate arrangement of the nozzle part and the joint plate arrangement of the mouthpiece each comprising at least one joint plate, and is configured to be removed from the connection to the two joint plate arrangements, the joint bolts having, at least in sections, a wedge portion which is wedge-shaped in a direction of a joint axis, and the at least one joint plate of each hinged joint being provided with a jamb portion of a joint eyelet for receiving the wedge portion of the joint bolt, said jamb portion being wedge-shaped in the direction of the joint axis.

2. The tap hole plug gun according to claim 1, wherein the joint plate arrangement of the nozzle part comprises two joint plates which are disposed at a vertical distance and between which the at least one joint plate of the mouthpiece is disposed so as to form the hinged joint, said at least one joint plate having the joint eyelet with the wedge-shaped jamb portion.

3. The tap hole plug gun according to claim 1, wherein an axial engagement device is formed between two opposite axial connecting edges of the nozzle part and of the mouthpiece.

4. The tap hole plug gun according to claim 3, wherein the engagement device has a ring web formed on one connecting edge and engaging into a complementary ring groove formed on the other connecting edge.

5. The tap hole plug gun according to claim 4, wherein the ring web has a truncated cross section.

* * * * *